United States Patent [19]

Roberson

[11] 3,912,479

[45] Oct. 14, 1975

[54] METHOD OF AND APPARATUS FOR PACKAGING A LINEAR GLASS FIBER ELEMENT

[75] Inventor: Cletis L. Roberson, Newark, Ohio

[73] Assignee: Owens-Corning Fiberglas Corporation, Toledo, Ohio

[22] Filed: Oct. 1, 1974

[21] Appl. No.: 510,935

[52] U.S. Cl. .............................. 65/2; 28/21; 65/6; 65/11 R; 65/11 W; 65/14; 242/47
[51] Int. Cl.² .................... C03B 37/04; C03B 37/06
[58] Field of Search........... 65/2, 11 R, 11 W, 6, 14, 65/9; 242/47, 82, 83; 28/21

[56] References Cited
UNITED STATES PATENTS 2,132,702   10/1968   Simpson ........................ 65/11 W X
2,741,009   4/1956    Slayter et al. ........................... 28/21
2,746,118   5/1956    Drummond et al. ..................... 28/21
2,972,439   2/1961    Cunningham et al. ............. 65/11 W Primary Examiner—Robert L. Lindsay, Jr.
Attorney, Agent, or Firm—Carl G. Staelin; John W. Overman; Ronald C. Hudgens

[57] ABSTRACT

Apparatus for and method of packaging a linear fibrous element in a rotated perforated cannister by withdrawing air from the cannister through its bottom wall to move air through the package during package formation to prevent freedom of movement to the element in the package and simultaneously withdrawing air uniformly from all sides of the cannister through its perforated sidewalls to reduce air turbulence in the cannister to promote ordered collection of the fibrous element.

8 Claims, 15 Drawing Figures

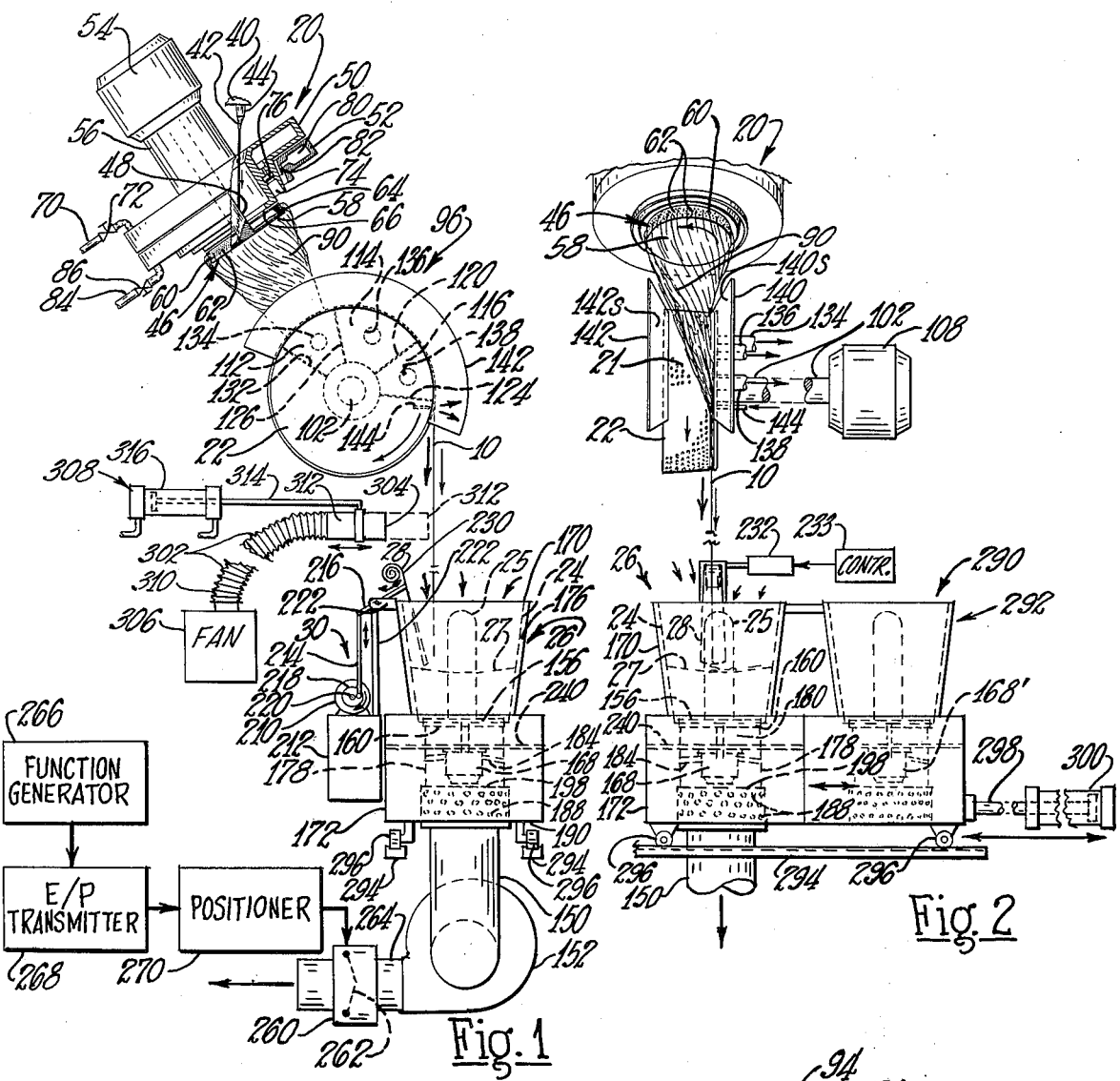
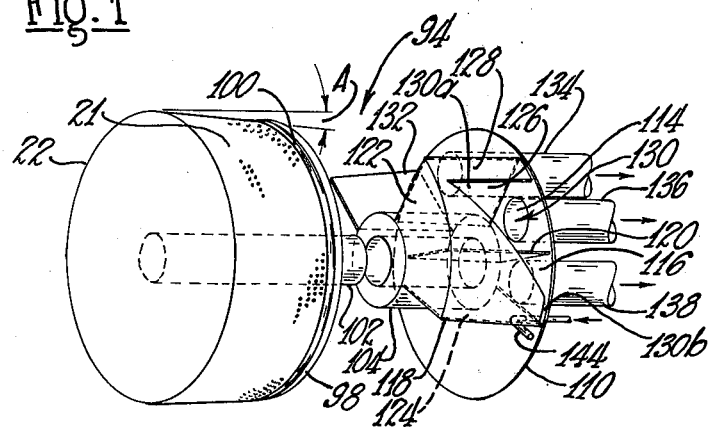
Fig. 1
Fig. 2
Fig. 3

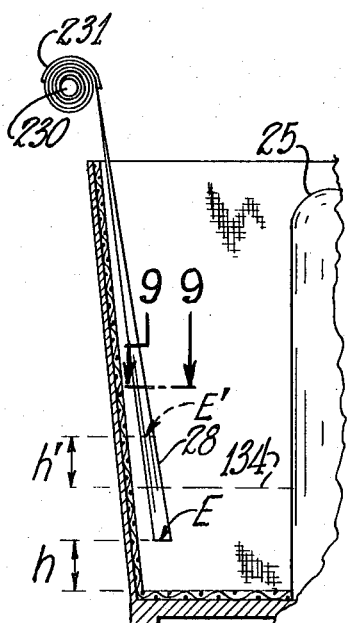
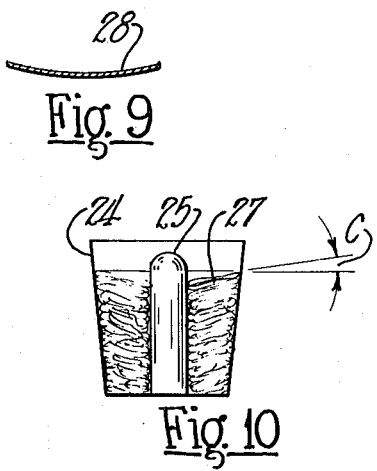
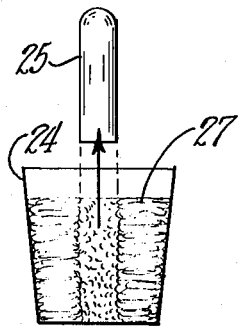
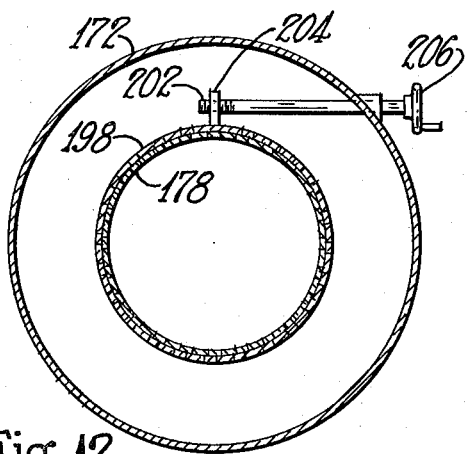
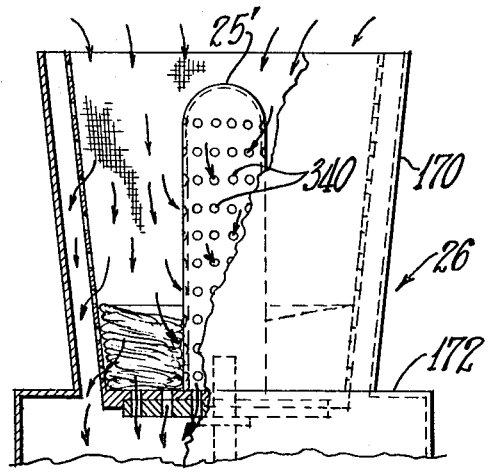
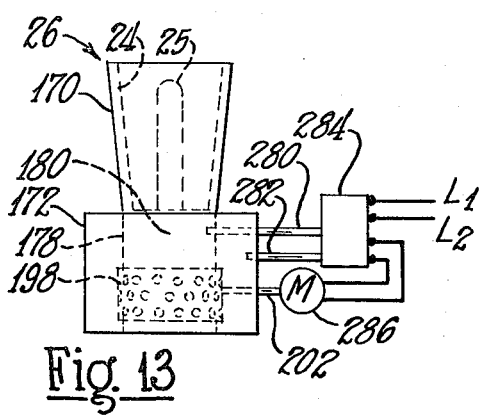

METHOD OF AND APPARATUS FOR PACKAGING A LINEAR GLASS FIBER ELEMENT

BACKGROUND OF THE INVENTION

Textile yarn made of continuous synthetic filaments are dense and artificial feeling. Hence over the years there has been a need to produce synthetic filament textile yarns that look and feel like natural fiber yarns.

Texturing continuous synthetic fiber yarn is one conventional commercial way to produce a bulky synthetic filament textile yarn having more natural appearance and feel. This can be done in one of several conventional ways. For example, yarn can be processed by false-twist, knit-de-knit or air bulking apparatus. Such apparatus produces bulky continuous filament yarn that meets some textile needs.

Another conventional commercial way produces what is known as spun yarn. Continuous filaments are formed into a heavy weight bundle called a tow that is crimped and chopped into short lengths. These chopped fibers, called staple fibers, are processed through modified spinning apparatus to make a spun yarn. This yarn has a softer feel and more natural appearance than continuous synthetic filament yarn.

Each of these basic conventional methods starts with the manufacture of a continuous synethetic filament yarn that must undergo secondary processing to avoid its synthetic characteristics. The conventional approaches (such as those mentioned and their many variations) require one or more slow secondary processes; these are expensive and, in many cases, difficult to control. Hence there is a need for a new approach to producing natural feeling and appearing yarn of synthetic filaments.

Recent developments in the textile field have provided a new and promising approach to producing natural feeling and appearing synthetic filament yarn from a linear sliver-like grouping of discontinuous fibers having sufficient coherency for processing into yarn. Individual fibers are continuously grouped into interengaging relation in the form of a thin coherent web or network, preferrably in a fiber forming operation. Normally web formation is done on the moving circumferential surface of a rotary device driven at high angular speeds. The fibers of the web are laterally condensed or gathered together to form a wispy linear sliver-like grouping. The rotary device linearly projects the linear sliver-like element grouping downwardly for collection.

The light, wispy, and fragile nature of the sliver-like textile element makes its collection into a satisfactory package most difficult. The package build must allow the fibrous element to be linearly withdrawn reliably without tangles, snarls and breaks for processing into yarn. Without a package providing essentially interruption free run-out (apparatus for producing such a package) development is stifled.

SUMMARY OF THE INVENTION

An object of the invention is improved method of and apparatus for producing and collecting a light linear fibrous textile element that can be formed into a yarn.

Another object of the invention is improved method of and apparatus for collecting a linear fibrous element into a package in a rotating cannister.

Still another object of the invention is improved method of and apparatus for forming a linearly projected linear fibrous element into a package in a foraminous container from which air is controllably withdrawn during package formation.

Other objects and advantages will become apparent as the invention is more fully described in connection with the accompanying drawings.

DESCRIPTION OF THE DRAWINGS

FIG. 1 is a side elevation of apparatus for producing and collecting of sliver-like fibrous glass element according to the principles of the invention in a glass fiber forming operation. The apparatus includes: a rotary glass fiber forming means; a rotatably driven hollow fiber collecting and condensing wheel from which the fibrous element is projected downwardly; and collection apparatus including rotated foraminous container for collecting the projected element, and air withdraw apparatus for removing air from the container during collection of the fibrous element. The container includes a center post or pylon. Some control features of the apparatus are shown in block diagram form.

FIG. 2 is a front elevation of the apparatus of FIG. 1.

FIG. 3 is an exploded perspective of the glass fiber collecting and condensing wheel and associated apparatus shown in FIGS. 1 and 2.

FIG. 8 is an enlarged showing in elevation of traversing apparatus shown in FIGS. 1 and 2.

FIG. 9 is a section taken along the lines 9—9 of FIG. 8.

FIG. 10 is a simplified elevation of a preferred form of package formed in the foraminous container shown in FIGS. 1, 2 and 4. The pylon of the container is in position.

FIG. 11 is a simplified elevation of the package of FIG. 10 with the center post or pylon removed.

FIG. 12 is a section taken along the lines 12—12 in FIG. 4.

FIG. 13 is a simplified showing of air controls used with the collection apparatus shown in FIGS. 1 and 2.

FIG. 15 is an elevation, partly in section, of a foraminous collection container using a porous or foraminous center post or pylon.

DESCRIPTION OF THE PREFERRED EMBODIMENTS

Figure 4:
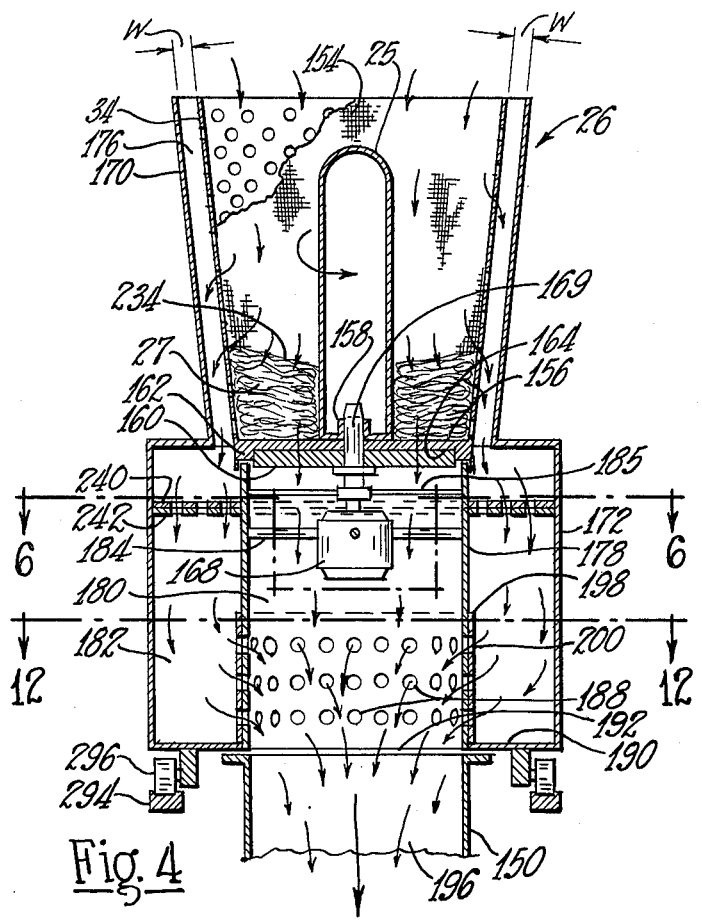
FIG. 4 is a side elevation, partly in section, of the foraminous container (with a mesh liner) and air withdrawal apparatus shown in FIGS. 1 and 2.

The fibrous product collected according to the invention can be made of organic or inorganic discontinuous synthetic fibers. For example, the fibrous product can be made of discontinuous inorganic fibers (such as glass) and organic fibers (such as nylon, polyester and the like). So it is to be understood the terms fibers, synthetic fibers, fibrous element and the like as used in the specification and claims refers to both organic and inorganic synthetic fibers.

FIGS. 1 and 2 show a preferred embodiment of apparatus for producing and collecting a light wispy fibrous glass element 10 according to the principles of the invention directly in a glass fiber forming operation. A rotary fiber forming means supplies individual discontinuous glass fibers to the moving circumferential surface of a rotatably driven fiber condensing wheel. The wheel brings the fibers together into the continuous linear fibrous element 10 and projects the element linearly downwardly to collect in a rotatably driven foraminous container.

Air handling equipment simultaneously withdraws air from the container through its foraminous bottom wall to move air downwardly through the collected portions of the element 10, thereby preventing their freedom of movement; and through its foraminous sidewall portion uniformly from all sides of the container to reduce air turbulence in the container and thereby promote orderly collection of the fibrous element 10.

Referring more specifically to FIGS. 1 and 2, the rotary fiber forming means or instrumentality, denoted by the reference numeral 20, supplies individual discontinuous glass fibers of sufficient length that the fibers can interengage into a coherent web or network. In practice, the length of the glass fibers is normally in a range of from 2 to 12 inches. Blasts of fiber attenuating gases from the instrumentality 20 carry the individual glass fibers downwardly to deposit them on the moving porous circumferential or rim surface 21 of a rotating hollow fiber collection wheel 22; the fibers collect in sufficient number and interengaging relation to form a thin coherent web or network.

Other sources might be used to supply discontinuous fibers. And glass fibers from the instrumentality 20 might be mixed with fibers from another source to effect a blend of the same or different fibers, e.g. organic and inorganic synthetic fibers.

A web condensing arrangement including means defining a stationary opening of progressively reducing size communicating with the porous circumferential surface 21 and means for establishing reduced pressure within the wheel 22 to draw a fluid such as air through the porous surface 21 into the opening through the fibers of the web. The moving fluid laterally condenses the web into the longitudinal light and fragile sliver-like fibrous element 10.

Means within the wheel 22 clears or releases the fibrous element 10 from the surface of the rotating wheel 22. And the tangential energy imparted to the element 10 by rotation of the wheel 22 projects the fibrous element 10 downwardly tangentially away from the wheel 22; the element collects in a rotating foraminous container 24 having a vertical central hollow post or pylon 25.

An air removal arrangement, which includes a movable air control enclosure 26 holding the rotatably driven foraminous container 24 and air drawing or suction apparatus cooperate to take air from the rotating container 24 in accordance with the principles of the invention during collection of the fibrous element 10 into a package 27.

The downwardly projected fibrous element 10 impinges the reciprocated tongue 28 of a traversing assembly 30. The tongue 28 effects movement of the fibrous element 10 back and forth between the vertically projecting pylon 25 at the central region of the container 24 and the sidewall portion 34 of the container 24.

In the embodiment illustrated a feeder 40 supplies a stream of molten glass 42 downwardly from a tubular outlet 44 to the interior of an inclined hollow centrifuging spinner or rotor 46. The feeder 40 can connect to a forehearth that supplies molten glass from a furnace or can connect to other means for supplying molten glass in a conventional manner.

FIG. 1 illustrates a partial cross section of components of the fiber forming assembly or instrumentality 20, which includes: the hollow spinner or rotor 46 fixed on the end of a rotatably driven shaft or quill 48; a burner 50 that provides a heated environment for primary filaments or centrifuges streams of molten glass from the spinner 46; and a blower 52 for delivering gaseous blasts into engagement with the primary streams or fibers to attenuate them into discontinuous glass fibers.

The assembly 20 is shown in a preferred disposition, inclined. In practice, an inclination of 45 degrees from the horizontal has given good results.

An electrical motor 54 drives the quill 48, and hence the spinner 46, in high speed rotation. The quill 48 is shown disposed in an inclined position extending through a housing 56. Bearings within the housing 56 journally supports the quill 48 for rotation.

The spinner 36 as shown is a one piece hollow disclike member including a circular solid bottom wall 58; a cylindrical circumferential sidewall 60 having rows of glass outlet openings or passageways 62 communicating with the interior of the spinner 46; and an inwardly extending circular flange 64 defining an opening 66 at the upper region of the spinner.

The glass stream 42 moves downwardly along a path through the opening 66 to the inclined bottom wall 58. As the motor 54 rotates the spinner, the molten glass of the stream moves outwardly along the interior of the circumferential wall 60 and leaves the rotating spinner 46 through the openings 62 as primary fibers or streams.

In practice the spinner 46 is normally from 4 to 8 inches in diameter and normally includes from 1,000 to 4,000 glass outlet openings 62. In operation it is usual to rotate the spinner at an angular speed of from 3,000 to 7,500 rpm's.

The burner 50 includes an annular shaped mixing and distributing chamber 68 with an inlet tube 70. The tube 70 connects at one end with a supply of fuel and air mixture and delivers the mixture to the burner 50. A valve 72 is disposed along the length of the tube 70 to control delivery of the combustible mixture into the annular chamber 68.

The burner 50 provides a variously sized annular discharge passageway 74. The combustible mixture from the chamber 68 is burned in the region of a screen 76 in the passageway 74. Flames or hot gases of combustion from the region of the screen 76 leave the passageway 74 to provide a heated environment for the primary streams or filaments centrifuges from the openings 62 in the circumferential wall of the rotating spinner 46.

The blower 52 includes a member providing an annular chamber 80 having an air outlet nozzle 82 including circumferentially spaced slots or orifices.

The chamber 80 is supplied with gaseous fluid under pressure, such as compressed air, from a supply through an inlet tube 84. The compressed gas is delivered through the slots of the nozzle 82 as a high velocity gaseous fiber-attenuating blast. A valve 86 is along the tube 84 to regulate admission of gas to the chamber 80 and hence the velocity of the fiber attenuating blast.

In operation the high velocity products of combustion discharged from the burner 50 flow over the circumferential moving surface of the spinner 46 to engage the primary fibers leaving the spinner through the openings 62. Thereafter the fibers are further engaged by the gaseous blast from the blower 52. So the attenuated fibers are moved by an envelope or body of moving gaseous media; a body 90 of gases and fibers is produced.

The body 90 is, in a sense, an envelope or body of gas and glass fibers moving with generally reducing cross section away from the rotating spinner 46 as more fully explained hereinafter. In practice, the traverse cross sectional shape of the body 90 is generally circular. And in practice, a 3½ inch width wheel 22 (width of the surface 21) has given good results.

Rotation of the spinner 46 imparts a considerable component of angular velocity to the primary glass fibers in a plane substantially perpendicular to the axis of the quill 48. But the moving blasts of gaseous fluids from the burner 50 and blower 52 modify this initial spinner imparted velocity until the major component of fiber velocity is in a direction moving towards the fiber collection region on the circumferential surface 21 of the rotating wheel 22. Similarly, the initial generally spiral paths imparted to the attenuated fibers by the spinner 36 become a more or less linear path moving in the direction of gas movement toward the circumference of the wheel 22.

The reducing size of the body 90 brings the attenuated fibers into closer and closer relationship. The flow in the body 90 at a location spaced from the spinner 46 brings the fibers together into what can be considered an inchoate or incipient network of gas borne but interconnected fibers. And the wheel 22 is located with its circumferential surface 21 in this region of the body 90. It has been a practice to make the width of the wheel (width of the surface 21) 22 substantially the same size as the diameter of the body 90 in the fiber depositing region.

The fibers are continuously deposited on the moving porous circumferential surface 21 of the hollow wheel 22 in sufficient number and in such interengaging relation that a thin coherent web or network of fibers is continuously formed at a circumferential collection region on the wheel. Fibers on the network are continuously removed from the zone of deposition by the advancing surface 21 and are progressively laterally condensed into the fibrous element. The deposition of the fibers as they are deposited and the "combing" action effected by the movement of the surface 21 work together to orient the fibers generally parallel to the circumferential axis of the surface 21.

Referring to FIG. 3 the web processing apparatus of the wheel 22 and associated apparatus can be seen to include a rotary assembly 94 and a stationary flow directing assembly 96.

In the embodiment shown the rotary assembly 94 includes the wheel 22, which is a one piece bowl shaped member, having a porous circular peripheral wall or rim 98 defining the exterior circumferential surface 21. The porous surface 21 has a porous groove 100 fashioned at one edge; the groove 100 extends around the entire circumference of the wheel 22 and is generally U-shaped in cross-section. As shown the groove 100 is at the open end of the bowl shaped wheel 22 and extends in a direction parallel to the circumferential axis of the wheel 22.

As shown the wall 98 of the wheel 22 is somewhat tapered towards the open end of the wheel. The angle of taper, shown as angle A in FIG. 3, is normally a small angle of from 10 to 20 degrees. The inclined surface 21 promotes lateral gathering or condensing of the fibers of the web towards the groove 100 during rotation of the wheel 22.

The wheel 22 is fixed on the end of a shaft 102, which is generally held horizontally for rotation in bearing member 104. The bearing member 104 forms part of the stationary portion of the rotary assembly 84. A motor 108 (see FIG. 2) rotates the wheel 22 through the rotation of the shaft 102.

Referring more specifically to FIG. 3, the stationary assembly includes a circular mounting plate 110, the bearing member 104 and means defining three chambers, viz. chambers 112, 114 and 116.

In the embodiment shown an enclosure 118 and a partition 120 within the enclosure defines the compartments or chambers 114 and 116. The enclosure 118 includes a sidewall 122, end walls 124 and 126 and a curved top wall 128. The shape of the top wall 128 and of the top of the partition 120 conforms to the interior shape of the rim 90 of the wheel 22. The top wall 128 includes a circumferential opening 130 of progressively narrowing dimension. The partition 120 within the enclosure 118 divides its interior into the compartments 114 and 116. One or more compartments can be used.

A partition 132 and the end wall 126, together with the closed end of the wheel 22, form the compartment 112.

A pressure deferential, conventionally accomplished by suction means, is maintained across the progressively narrowing opening 130.

Each of the compartments communicates with a reduced pressure zone, which can be established in a convention manner. Tubes 134, 136 and 138 each communicate at one end, through an opening in the plate 110, with compartments 112, 114, and 116 respectively. The other end of each of these tubes communicates with an individual reduced pressure zone. Hence, a fluid media such as air can be sucked through the porous rim 88 into each of the compartments. In practice, the tubes 136 and 138 connect the compartments 114 and 116 with zones of unequal reduced pressure to effect a substantially uniform flow of air into the narrowing opening 130 along its entire length. In practice, the suction applied to the chamber 114 is normally in a range of from 5–20 inches of water; the suction applied to the chamber 116 is normally in a range of from 15–20 inches of water.

In practice the chamber 112 is below the fiber deposition zone of the circumferential surface 21 of the wheel 22. The reduced pressure established in the chamber 112 draws attenuating gases of the body 90 through the porous wall 98 of the wheel 22. Further, the suction traps or holds glass fibers of the body 90 on the moving circumferential surface 21. Normally the suction is sufficient to draw the gases of attenuation into the chamber 112 at a rate that overcomes blow-back of these gases from the surface 21. Such blow-back tends to disrupt fiber deposition on the surface 21. A suction in the range of from 5–8 inches of water is commonly used.

The motor 108 rotates the wheel 22 sufficiently fast to withdraw the coherent fiber web from the deposition zone at a rate substantially equal to the rate of web formation. The speed of the pulling wheel 22 may be varied to change the thickness of the coherent fiber web.

The moving surface 21 advances the web across the top of the enclosure 118 to the narrowing opening 130 for condensing. The largest width of the opening 130 is normally substantially the width of the opening of the compartment 112 at the surface 21. As shown the largest width of the opening is somewhat smaller than the width of the compartment 112. The width of the opening 130 can progressively reduce along its entire length, or as shown, can include a narrowing portion 130a and a substantially constant width portion 130b. The portion 130b is generally under the groove 100 into which the product 10 is moved.

Porosity of the circumferential wall 98 is important. The porosity of the wall 98 must be sufficient to permit fluid flow into the interior of the wheel 22 with sufficient energy to withdraw the gases of fiber attenuation and hold the web onto the advancing surface 21 at the region of fiber deposition. Further, the porosity of the wall 98 must permit sufficient air to flow across the fibers of the web into the opening 130 to progressively condense the web as the web moves across the opening 130. Yet the openings in the surface 21 should not be large enough to trap fibers. In practice good results have been obtained using a rim 98 with openings having a diameter of 0.070 inches. In such an arrangement these holes are aligned in 24 rows, each having 336 equally spaced openings where the wheel 22 is 14 inches in diameter (smallest diameter) and where the rows are 9/64 of an inch apart.

Referring more particularly to FIGS. 1 and 2, the assembly 96 is at the upper side of the wheel 22. And as shown the assembly 96 includes two spaced apart opposing stationary curvilinear wall members or flow director elements 140 and 142 oriented traverse to the axis of the wheel 22 and at the edge regions of the wheel's circumferential surface 22. These members promote reduction in the cross section of the body of gas and fibers 90. The members reduce induced air flow into the body. This keeps the fluid energy of the body 90 high, which effects a contraction of the body 90. The pressure rise of the gaseous fluid of the body 90 must be kept low enough for substantially uniform flow towards the collection surface 21. A steep pressure gradient can cause disturbed fluid flow of the gases.

The wall members 140 and 142 include flow director or control surfaces 140s and 142s, which are inclined to the circumferential surface 21 of the wheel 22. The member 142 is adjacent to the groove 100; as shown the member 142 is at the other edge of the surface 22. A web of substantially uniform fiber concentration across its width is deposited on the rim 98.

The fibers of the web are laterally condensed or gathered as the porous rim 98 of the wheel 22 moves the web across the stationary opening 130 of progressively decreasing or narrowing dimension. Air is moved, e.g. drawn, into the compartments 114 and 116 through the fibers of the web and the porous surface 21 with sufficient energy to progressively laterally move the fibers of the web to condense or gather them as they are moved towards the porous groove 100. The air moves the condensed web (fibrous element 10) into the groove 100. Fiber condensing progressively occurs generally in accordance with the diminishing width of the opening 120.

The stationary assembly includes means for releasing the product from the rotating wheel 22 (groove 100). As more clearly shown in FIG. 3, an air tube 144 within the wheel 22 located immediately below the enclosure 118 discharges a stream of air through the porous circumferential wall of the wheel 22. This stream or blast of air directed outwardly through the porous wall 88 wheel 22 disengages the sliver-like product from the moving wheel. The tube 144 is connected to any supply of suitable gas, e.g. air, under pressure.

The tangential energy imparted to the product by the rotating wheel 22 linearly projects the element 10 downwardly along a path tangential to the wheel 22.

In FIG. 2 the rotating wheel 22 projects the element 10 downwardly to the collection apparatus; the rotating container 24 collects the projected element 10.

Again referring more particularly to FIGS. 1, 2 and 4, it can be seen that the collection apparatus includes: the foraminous container or cannister 24 for collecting the fibrous element 10 into the package 27; the traversing assembly 30 (including the reciprocated tongue 28) for distributing the element 10 in the container 24 during its collection; and air handling equipment for withdrawing air from the container 24 during collection of the element 10. The air handling equipment includes the air handling enclosure or chest 26, an air duct 150 communicating at one end with the interior of the chest 26, and an air drawing means in the form of a suction blower 152 communicating with the other end of the duct.

The container 24 is an open topped rigid bucket-shaped vessel normally made of perforated sheet steel. All of its walls have apertures. So all of the walls of the container 24 are porous or foraminous. As shown all the walls have the same uniform porosity, although it may under some conditions be advantageous to have walls with different porosity; for example, a container having a more porous bottom wall might be useful.

In practice good results have been obtained using a cannister 24 made of perforated sheet steel with 23 percent open area from circular perforations having a diameter of 0.027 inches.

The container 24 is shown with a tapered sidewall portion 34 so the container is larger at its upper region than its base region. A taper of around 5 degrees from the vertical has been advantageous in practice.

The container 24 has a removable porous lining 154 (having a sidewall and bottom) that conforms to the interior shape of the container 24. As illustrated the lining 154 is of collapsible mesh construction. The fibrous element 10 collects as the package 27 in the lining 154. So in the embodiment shown the container 24 is, in a sense, a rigid outer perforated support for a collapsible mesh container (the lining 154). But in some instances the lining can be rigid; in other cases a lining may not be required.

An operator removes the lining 154 (with the package 27) after package formation. He then places a fresh lining in position in the container 24 for collecting a new package.

In practice a mesh lining 154 made of vinyl coated glass yarn (normally having a yarn diameter of from 0.0109 to 0.0130 inches) insect screening having a unifrom mesh size of from 18 to 30 meshes per inch has given good results in collecting the fibrous glass element 10.

The combined porosity of the container 24 and lining 154 (in the container 24) must be sufficient to allow withdrawal of desired amounts of air from the container 24 during collection of the element 10 into the package 27. Yet the size of the container apertures and the mesh size of the lining 154 must be small enough so that the element 10 is discouraged from becoming trapped in them.

The container 24 has an upwardly projecting center member, shown as the hollow center post or pylon 25 on the container's porous bottom wall 156. As shown the pylon 25 engages the outer surface of a centering dowel 158 projecting upwardly from the bottom wall 156.

The pylon 25 provides a centrally located control surface for the fibrous element 10 during its collection. Normally the exterior of the pylon 25 is teflon coated to provide a smooth nonabrasive contact surface for the fragile fibrous element 10 collected in the container 24. In the embodiment shown an operator would normally remove the pylon 25 from the package 27 before he takes the liner 154 from the container 24.

Figure 5:
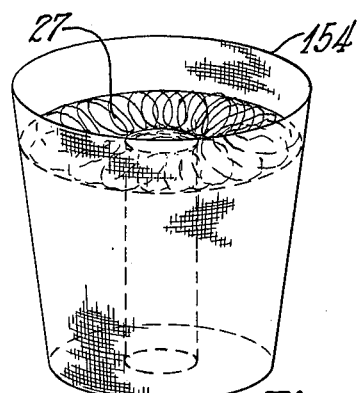
FIG. 5 is a perspective of the package formed using the apparatus of FIGS. 1 and 2. The package is in the mesh liner for the collecting foraminous container.

Of course, with the pylon 25 a somewhat doughnut shaped package 27 is formed (see FIG. 5).

The container 24 sets on a rotatably driven circular porous or perforated platform 160. The exterior surface of the bottom wall 156 has a circular ridge 162 that defines an inner circular recess 164. The diameter of recess 164 is the same size as the diameter of the platform 160. So the container 24 rests on the platform 164 in a stable manner during rotation.

Any type of suitable alignment means (such as indexing pins) can be used to align the apertures of the platform 160 with the apertures of the bottom wall 156. It is useful to have the apertures of the platform be the same size and spacing as these in the bottom wall 156.

A motor 168 stationarily mounted below the platform 160 rotates the platform 160 through suitable means such as a keyed shaft 169 (FIG. 4). Suitable means, such as the above mentioned indexing pins, can be used to bring the platform 160 and container 24 into driving association.

The container 24 rests in an upstanding open topped solid walled bucket-shaped shroud 170 when placed on the platform 160. The shroud 170 comprises the upper part of the air handling chest 26, which further includes a lower enclosure 172.

The shroud 170 is the same shape as the container 24, but larger. So there is an annular space 176 between the interior surface of the shroud 170 and the exterior surface of the container 24 when the container is resting on the platform 160. The space 176 forms an air handling passageway that receives air withdrawn from sidewall portion 34 of the container 24 and that communicates with the interior of the lower enclosure 172. The passageway 176 directs the withdrawn air downwardly in a direction axially of the container 24 to the interior of the lower enclosure 172. In practice a passageway width (denoted as w in FIG. 4) of from 0.75 of an inch to 1 inch has been found useful. The width w of the passageway 176 is constant along its entire length as shown in the embodiment of FIGS. 1 and 2 since the shroud 170 is the same shape as the container 24. But the width w can vary to optimize pressure gradients.

An upstanding tubular member or stack 178, stationary within the lower enclosure 172, divides the interior of the lower enclosure 172 into inner and outer chambers, denoted 180 and 182 respectively. The outer chamber 182, like the passageway 176 with which it communicates, has an annular shape. And since the stack 178 extends the entire height of the lower enclosure portion 172, the inner chamber 180 forms an inner air passageway running vertically through the enclosure 172.

Struts 184, which are fastened at their outer ends to the stack 178 and at their inner ends to the motor 168, support the motor 168 within the inner chamber or passageway 180. A perforated support plate 185 is also shown to provide support for the platform 160 and motor 168.

The lower portion of the stack 178 has air flow ports 188 through which air can move between the inner and outer chambers 180 and 182.

The stack 178 is secured on the bottom wall 190 of the enclosure 26 to embrace or encompass a circular air discharge opening 192 (FIG. 4) in the bottom wall 190.

The opening 192 is in alignment and communication with the entrance 196 of the air duct 150. As shown the opening 196 has the same size diameter as the inside diameter of the duct 150.

The blower 152 is at the other end of the duct 150.

So the air handling chest 26 (with the container 24 resting on the platform 160), duct 150 and blower 152 combine to establish an air handling system for withdrawing air from the container 24 during collection of the fibrous product 10 in the container 24.

An air control sleeve 198, surrounding the lower portion of the stack 178 in sliding relation, controls air flow between the inner and outer chambers 180 and 182. The sleeve 198 has air ports 200 that are the same size as the ports 188. The ports 200 are positioned on the sleeve 198 so that movement of the sleeve around the stack 178 allows their alignment with the ports 188 (for maximum air flow between the inner and outer chambers 180 and 182). Movement of the sleeve 198 can reduce the size of the air flow openings between the chambers by moving the ports 188 and 200 out of alignment.

So the sleeve 198 controls the proportion of air simultaneously withdrawn from the container 24 through its bottom wall 156 and through its sidewall portion 34 during collection of the fibrous element 10.

Figure 6:
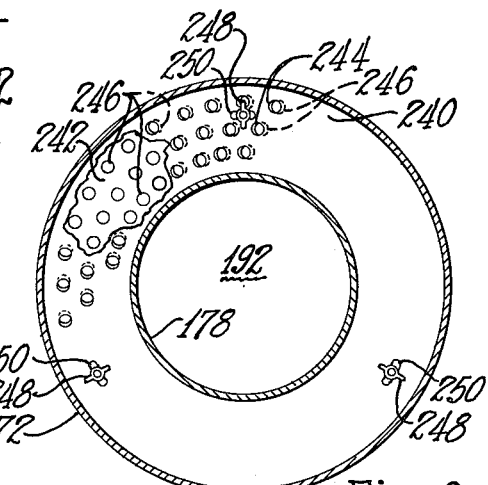
FIG. 6 is a section taken along the lines 6—6 in FIG. 4.

Referring to FIG. 6, it can be seen that an operator can move the sleeve 198 by rotating a threaded adjustment rod 202. This rod extends through an opening in the wall of the enclosure 172 to threadably engage a threaded lug projecting horizontally from the sleeve 198. A handle 206 on the outside end of the rod 202 facilitates rotation of the rod 202, and hence adjustment of the sleeve 198.

Figure 7:
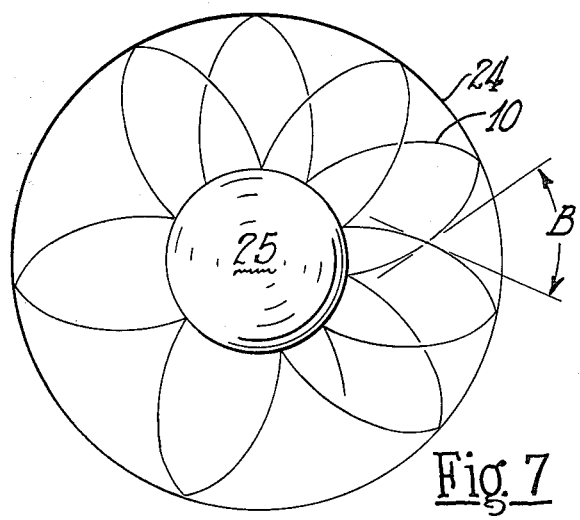
FIG. 7 is a view looking down onto the top of the package formed in the foraminous container by the apparatus of FIGS. 1 and 2.

In operation the reciprocated tongue 28 distributes the downwardly projected and impinging fibrous element 10 in the rotating container 24 on the forming package in overlapping orientation generally as indicated in FIG. 7. As can be seen such disposition of the element 10 puts adjacent portions in orderly crossing relationship for tangle or snarl free linear withdrawal from the container 24. It has been found that element portions crossing at angles of from 30 to 60 degrees, denoted as angle B in FIG. 7, provide packages with element orientation promoting substantially trouble free linear withdrawal of the fibrous element 10 during subsequent processing.

The package 27 includes layers of looped portions of the fibrous element 10.

Referring again to FIG. 1, in more detail, it can be seen that the tongue traversing assembly 30 includes a motor 210 and drive system for reciprocating the tongue 28. The motor 210 is on a stationary support 212 at one side of (but separate from) the air chest 26. The motor 210 drives linkage, including a drive crank 214 and connecting link 216, thorugh a cam 218 fixed on its output shaft 220. The drive crank 214 pivotally connects at one end eccentrically on the cam 218; at the other end it pivotally connects to one end of the connecting link 216. A support member 222 on the stationary support 212 pivotally holds the connecting link 216 at its mid-region. The free end of the connecting link 216 is in touching relationship with the underside of the tongue 28.

In operation the movement of the free end of the connecting link 216 is moved back and forth around its pivot on the support member 222; in operation this movement effects a swinging or reciprocating movement to the tongue 28. In practice the tongue 28 has been advantageously reciprocated at rates of from 175 to 350 cycles per minute. Of course, the speed of reciprocation depends on variables such as the rpm of the cannister 24 (which is normally fairly slow, e.g. 30 rpm) and the density of the fibrous element 10.

Throughout formation of the package 27 air is withdrawn from the foraminous container 24 to promote ordered collection of the fibrous element 10 and thereby promote formation of a package 27 capable of reliable run-out characteristics. Referring to the arrows indicated in FIGS. 1, 2 and 4 it can be seen that air is drawn into the container 24 through its open top by suction or drawing effected by the blower 152 (some entrained air also moves into the container 24 by the downwardly projected element 10). The blower 152 simultaneously withdraws air from the container 24: from the foraminous bottom wall 156 (directly into the inner chamber 180) and uniformly from all sides of the foraminous sidewall portions 34 (directly into the annular passageway 176). During package formation the velocity of the air flow downwardly (air removal) through the collected portion of the element 10 (package 27) acts as a holding force on the upper surface of the package during its formation; this force prevents freedom of movement to the collected portions of the element 10 and compacts the package 27. And the simultaneous withdrawal of air uniformly from all sides of the container 24 reduces air turbulence; this lateral air flow promotes reduction in boundry layer formation along the interior of the sidewall portion 34 and reduction in disruptive air currents in the container 24 that would otherwise disturb deposited portions of the fibrous element 10 during package formation.

Proportioned flow between the simultaneous withdrawal of air through the sidewall portion 34 and through bottom wall 156 of the container 24 is necessary for full benefit from the operation of the invention. On one hand, too much air removal from the sidewall portion 34 establishes air movement that carries portions of the element 10 onto part of the upstanding interior surface of the sidewall portion; in a sense portions of the upstanding porous interior surface of the sidewall portion 34 become coated with the element 10 because the lateral air flow becomes too strong or pronounced. A poor package build results. On the other hand, too much air removal through the bottom wall 156 (downwardly through the package 27) will excessively compress the package. The porosity of the package decreases; reduced porosity discourages air removal through the bottom wall 156. And reduced air removal through the package reduces the velocity of the air flow holding the element 10. And this can establish confused air flow conditions in the container. A poor package build results.

Adjustments to the sleeve 198 can be made by an operator to establish desired balanced air removal from the container 24 for a particular fibrous element and package density.

Referring to FIGS. 1, 2, 8 and 9, to keep uniform orientation of the deposited element 10 in and between the layers of the package 27 the traversing assembly 30 retracts the tongue 28 during collection.

The tongue 28 as shown is a thin elongated spring steel member curved widthwise as shown in FIG. 9. The tongue is wound as a coil on a mandrel 230. Arcuate guides 231 (FIG. 8) are at each of the sides of the tongue 28 at the mandrel region. The tongue 28 flattens as it is coiled without flattening the extended portion thereof (the guides 231 assist).

The tongue 28 is extended and retracted from the coil by a motor 232 that rotates the mandrel 230. In practice the motor 232 is a reversible variable speed fractional horsepower motor (for example, one of the fractional horsepower motors commercially available from the Bodine Electric Company of Chicago, Illinois).

The rotational speed and direction of the output shaft of the motor 232 (and mandrel 230 too) is controlled by operation of a suitable motor controller 233 (FIG. 2), such as controller model number SCR 12 available from the B and B Motor and Control Corporation of New York, New York. The SCR 12 has motor reversing controls and has been modified to incorporate means for switching between desired high and low speeds.

The end of the tongue 28, denoted by the reference letter E in FIG. 9, is kept in spaced relation, preferably a selected constant spaced relation, above the upper surface 234 of the package 27 during collection. This can be done by adjusting or setting the controller 233 to operate the motor 230 in a direction and at a speed that moves the tongue 28 away from the package 27 at a rate substantially equal to the growth or increase in the height of the package 27 during its formation. This relationship is indicated in FIG. 8 where a predetermined height of the tongue 28 above the package 27, denoted as h and h' (both indicating the same distance), is indicated at two different times during package formation.

A constant spaced distance between the upper surface 234 of the package 27 and the tongue 28 provides a substantially constant free length of the element 10 between the surface 234 and the tongue 28 during package formation. And this helps build a package that is uniformly constructed throughout.

The air movement in the container 24 during package build assists placement of the element 10. The air movement has an influence on the path of the element after it leaves the tongue 28. The downward movement of the air near the pylon 25 pulls the element downwardly after it is pushed from the tongue 28 towards the pylon. And the outwardly flow of air moves the element downwardly towards the vertical sidewall portion 34 after it leaves the tongue 28. So the amplitude of the swing given to the tongue and the air flow in the container 24 cooperate to lay the element 10 snuggly against the pylon 25 and the sidewall portion 34.

It is advantageous to establish air flow through the container 24 effective to form a package 27 that is slightly taller in height (less compact) at its outer circumferential region that its inner region near the pylon 25; FIGS. 10 and 11 show such a package. In preparing to remove the package 27 (in the lining 154) from the container 24, an operator normally removes the pylon 25. And its movement upwardly from the package 27 during removal releases the wall capture to allow the central portion of the package 27 to move upwardly slightly to its natural density of repose. So ideally the depression at the central region of the package 27 should offset the upward movement centrally of the package 27 from removal of the pylon; then the upper surface 234 of the package 27 would be essentially normal to the axis of the package 27 after pylon removal. And the density or compactness of the package 27 would be substantially uniform throughout its transverse cross section. FIGS. 10 and 11 illustrate the relationship.

A small angle of inward taper in the range of from 10° to 20°, denoted as angle C in FIG. 10, should normally provide a substantially flat surface 234 (a package having a substantially uniform height) upon removal of the pylon 25. This type of package uniformity promotes tangle free withdrawal of the fibrous element 10 from the package 27. Of course angle C changes with changes in the process, such as changes that effect differences in the bulk of the fibrous element 10 (including fiber diameter and length).

The apparatus further includes horizontal apertured annular air resistances flow plates 240 and 242 in the outer chamber 182; these plates offer resistance to exhaust air flow moving downwardly from the sidewall portion 34 of the container 24 into the outer chamber. Consequently there is a pressure drop across the plates, with an ensuing static pressure region immediately above the plates. During operation the plates promote more uniform withdrawal of air from the sidewall portion 34 on the container 24 at all sides during package formation.

Referring more particularily to FIGS. 4 and 6, it can be seen that plate 240 (having apertures 244) rests on plate 242 (having apertures 246). As shown the plates are identical, so the apertures 244 and 246 can be aligned. It has been useful to use plates having apertures in the range of 3/16 inch to ¼ inch in diameter.

The top plate 240 is movable; the bottom plate 242, stationary. The plate 242 is secured to the walls of the lower enclosure 172 and the stack 178. Movement of the top plate 240 changes the open flow through area. And, of course, the setting can be adjusted to obtain the desired air flow downwardly through the plates. Wing nuts 248 in slots 250 hold the plates in secured together relationship.

A preferred form of the invention includes flow control apparatus for controlling air flow in the container 24 effective to form a package 27 having a substantially uniform compaction or density throughout (that is from end to end). To do this the control apparatus keeps air flowing downwardly into the upper surface region of the package 27 at a substantially uniform predetermined velocity throughout package formation. This means the reduced or negative pressure in the inner chamber 180 must be increased (made more negative) to compensate for increased resistance to air flow through the package from increased height (increased package size). In other words, the increase in negative pressure is changed at a rate corresponding to the growth rate in the height of the package 27; then the changes in negative pressure can keep the predetermined uniform velocity air flow into the upper region of the package. Of course, the predetermined air velocity must be sufficient to prevent freedom of movement to the collected portions of the fibrous element 10 at the upper package surface 234.

FIG. 1 includes a showing of an embodiment of suitable flow control apparatus that comprises: a hinged vane air flow valve or damper 260 (the vanes being denoted by the reference numeral 262) in the exhaust duct 264 and controls for varying the position of the vanes 262 during formation of the package 27. The controls include a function generator 266, an electropneumatic (E/P) transmitter 268 and a pneumatic position device 270.

The function generator 266 can be conventional. For example, it might be a mechanical generator. In such an arrangement, a curve corresponding to changes in negative pressure needed in the inner chamber 180 to keep the predetermined air flow velocity into the upper surface region of the package 27 can be formed on the circumferential surface of a rotatable drum as a data track. The drum is rotated. And a follower, such as stylus follower or a photocell follower, can be used to follow the data track curve on the rotated drum. The follower is connected to means for varying the DC voltage output of the function generator 266. So the magnitude of the voltage output (analog output) of the function generator corresponds to the data track curve.

The E/P transmitter 268 can be conventional. As shown the transmitter 268 is an electropneumatic device like those manufactured by the Foxboro Company of Foxboro, Massachusetts. The device 268 is a transducer: it converts the electric signal from the function generator 266 to a corresponding pneumatic signal. And the transmitter 268 provides that pneumatic signal to the position device 270.

The device 270 can be conventional. For example, it can be a pneumatic position device such as a pneumatic valve positioner manufactured by Conoflow Corporation of Blackwood, New Jersey. The device 270, moves the vanes 262 of the damper 260 in response to the signal from the function generator 266.

The damper 260 may be conventional. For example, it is possible to use a vane type damper manufactured by North American Manufacturing Company of Cleveland, Ohio.

During package formation the controls open the vanes 262 at a rate corresponding to increases in the height (resistance) of the package 27. And this effects a corresponding increase in negative pressure (from the blower 152) in the inner chamber 180 to keep predetermined air flow velocity downwardly into the upper surface region of the package 27 during package formation.

Also, in a preferred embodiment of the invention there is control apparatus to keep the withdrawal of air from the sidewall portion 34 of the container 24 sufficient to reduce air turbulence (and boundary layer build-up), yet insufficient to interfer with the orderly formation of the package 27. As explained, excessive air withdrawal from the sidewall portion 34 can overcome the holding influence of the air flow into the package 27 at its upper region; the interior surface of the sidewall portion 34 becomes coated with the fibrous element. And this disrupts package formation.

FIG. 13 shows an embodiment of a suitable control for modifying air withdrawal from the sidewall portion 34 as the height of the package 27 increases (as the negative pressure in the chamber 180 increases). As shown the controls include: pressure sensing pitot tubes 280 and 282, a differential pressure sensitive controller 284, and an actuator motor 286 (receiving electrical energy from leads $L_1$ and $L_2$).

The tube 280 senses the negative pressure in the inner chamber 180; the tube 282 senses the negative pressure in the outer chamber 182.

The controller 284 senses the difference in pressure between the pressure of tube 280 and the pressure of tube 282. And if the difference in pressures is outside a selected range, the controller 284 actuates the motor 286.

As shown the energized motor 286 drives the adjustment rod 202 (without the handle 206) to modify the position of the air control sleeve 198.

The components of the controls can be conventional. For example, the pressure sensitive controller 284 might be a Magnehelic gage and pressure switch manufactured by Dwyer Instruments, Inc. of Michigan City, Indiana; the actuator motor 286 might be a PENN Actuator supplied by The New York Blower Company of Chicago, Illinois.

The pressure difference between the inner chamber 180 and outer chamber 182 needed during package formation, for a particular package, can be determined empirically. And this can be set into a device such as the Magnehelic to control the operation of the motor 286 during package formation.

Referring to FIGS. 1 and 2, it can be seen that the collection arrangement for the fibrous element 10 includes two collection stations, the air control enclosure 26 and an air control enclosure 290, which is identical to the enclosure 26. The enclosures are joined together into an assembly 292 and are movable on tracks 294. As shown rotatable wheels 296 on the assembly 292 engage the tracks 294.

The duct 150 and fan 152 arrangement is shown to be stationary.

A pneumatic device including a piston 298 and a cylinder 300 moves the assembly back and forth alternately to locate a fresh collection container (e.g. container 24) and air handling enclosure (e.g. enclosure 26) under the wheel 22.

The embodiment of the invention shown in FIGS. 1 and 2 also includes interim scrap collection apparatus used primarily at start-up and transfer (between collection with enclosures 26 and 290). As illustrated the scrap collection apparatus includes: means 302 defining a suction guide passageway having its entrance opening 304 adjacent the path of the element 10 during collection, a suction fan 306 in communication with suction guide passageway at its exit end remote from the collection region, and means 308 for moving the means 302 to locate the opening 304 in and out of its scrap collection location.

More specifically, as shown in FIG. 1, a flexible duct 310, together with a rigid end piece 312 combine to define the suction guide passageway.

The moving means 308 is shown as a pneumatic device including a rod 314 (holding the rigid piece 312) and a cylinder 316. As indicated by the dashed lines in FIG. 1, the motor is operated to move the opening 304 into and out of scrap collection position.

Figure 14:
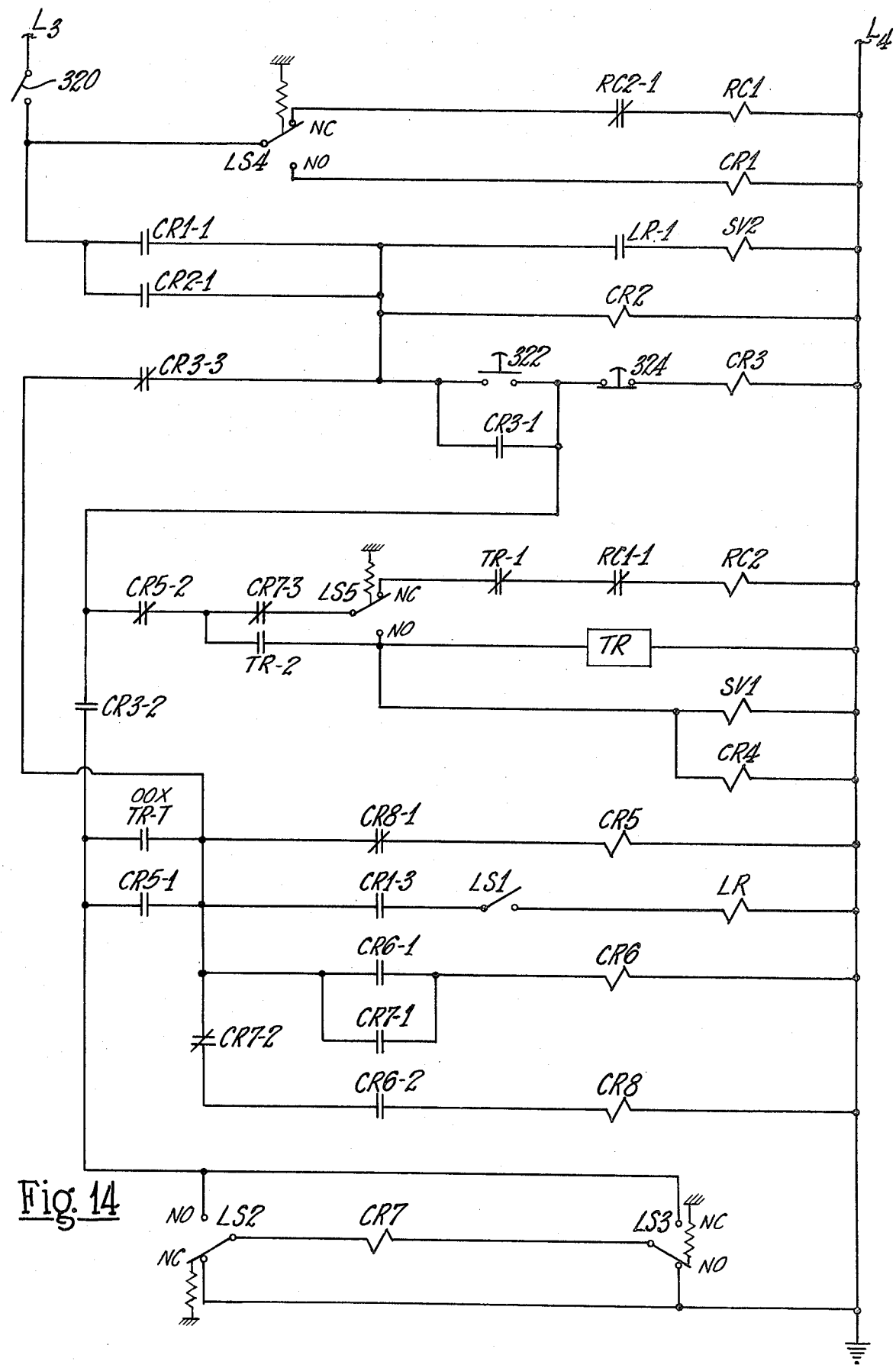
FIG. 14 is an electrical control diagram for the apparatus of FIGS. 1 and 2.

FIG. 14 is an electrical control diagram of a circuit for sequencing the collection apparatus shown in FIGS. 1 and 2.

At start-up the apparatus of FIGS. 1 and 2 is in a rest condition that places the scrap collection apparatus with the entrance opening 304 immediately adjacent the path of the projected fibrous element 10 (dashed lines in FIG. 1). And the piston 298 is in the retracted position. So the enclosure 26 (container 24) is in its collection position under the wheel 22 as shown in FIGS. 1 and 2.

The control circuit of FIG. 14 receives electrical energy from a commercial source at $L_3$ and $L_4$.

At start-up an operator closes switch 320 to energize the circuit.

If the tongue 28 is not fully retracted upwardly from the container 24, the tongue 28 is rapidly retracted until it effects physical movement of a spring biased limit switch LS4 from its NC position to its NO position. In the NC position a relay RC1 is energized; and in its energized condition the relay RC1 sets the controller 233 to rotate the motor 232 for quick withdrawal of the tongue 28. With the limit switch LS4 in the NO position, the RC1 relay becomes de-energized (the motor 232 is stopped) and a relay CR1 becomes energized.

The energized relay CR1: closes contacts CR1-1 to energize relay CR2 (and solenoid SV2 when contacts LR-1 are closed). The solenoid SV2 forms part of a solenoid valve controlling air to the cylinder 300; with the solenoid SV2 in the de-energized condition the valve provides air so that the piston 298 is in its retracted position as shown in FIG. 2.

The energized relay CR2 closes holding contacts CR2-1.

The circuit is now ready for automatic operation. So the operator closes an automatic start switch 322. A relay CR3 becomes energized; it closes holding contacts CR3-1 to keep itself energized. It also closes contacts CR3-2 and opens normally closed contacts CR3-3. Also, the closed switch 322 energizes relay RC2 (through limit switch LS5 spring biased in the NC position and a series of closed contacts).

The energized relay RC2 sets the control 233 to rotate the motor 232 for quick extension of the tongue 28 downwardly into the container 24. It also opens normally closed contacts RC2-1 to keep RC1 de-energized (when the tongue 28 begins to be extended, the limit switch LS4 is pulled back to its NC position).

When the tongue 28 is fully extended, the limit switch LS5 is physically moved to the NO position. The relay RC2 (and hence the motor 232) becomes de-energized. In the NO position the limit switch LS5 energizes: a timer TR, a solenoid SV1 and a relay CR4. The energized timer TR closes holding contacts TR-2 and opens normally closed contacts TR-1. The energized solenoid SV1 (which forms part of a solenoid valve controlling supply of fluid to the cylinder 316) causes the moving means 308 to retract the rod 314; the rigid post 312 of the scrap take-up is moved away (solid line position of FIG. 1). The energized relay CR4 sets the controller 233 (together with relay RC1; relay RC2 is not energized) to rotate the motor 232 to retract the tongue 28 (the relay RC1 is energized; the relay RC2 is not energized) at a slow speed matched in rate to the rate of growth of the package 27.

The limit switch LS5 is pulled back to the NC position when the tongue 28 begins to be retracted. But the timer TR, the solenoid SV1, and the relay CR4 remain energized through the holding contacts TR-2.

The timer TR is set to the desired package build or package formation time. When the timer TR times out, it closes time controlled contacts TR-T to energize relay CR5. Contacts TR-1 close. Contacts TR-2 open; therefore, solenoid SV1 and relay CR4 become de-energized. So the scrap collection apparatus is moved forward to place the scrap entrance opening 304 in the dashed line position (FIG. 1). In this position a limit switch LS1 is physically closed. The de-energized relay CR4 sets the controller 233 to retract the motor 232 (the relay RC1 is energized) at the fast rate to quickly take (retract) the tongue 28 from the container 24.

When fully retracted the tongue 28 causes the limit switch LS4 to be moved to the NO position to energize the relay CR1 (which closes contacts CR1-3).

Since contacts CR5-1 and CR1-3 are closed and switch LS1 is closed, a latching relay LR is energized. And this energized relay closes contacts LR-1 to energize the solenoid SV2. So the piston rod 298 is extended to place collection enclosure 290 under the wheel 22.

The latching relay LR is of a type that closes contacts LR-1 only on alternate energizations.

Spring biased limit switches LS2 and LS3 are located to be switched when the positions of the enclosures 26 and 290 are changed. As shown in FIG. 14 the assembly 292 is positioned as shown in FIG. 2 (the piston 298 in the retracted position); the assembly 292 physically holds the limit switch LS3 in the NO position. When the piston is extended and the enclosure 290 is in the collection location, the assembly 292 will physically hold the limit switch LS2 in the NO position. During transition movement of the assembly 292 (as the enclosures 26 and 290 move into and out of their package collection positions) one of the limit switches will be positioned so as to energize relay CR7.

The energized relay CR7 closes contacts CR7-1 and opens contacts CR7-2 and CR7-3. When contacts CR7-1 close, a relay CR6 becomes energized, which closes holding contacts CR6-1 and contacts CR6-2. CR7-3 when opened prevents RC2 from being energized regardless of the state of TR-1 and RC1-1.

When the enclosures 26 and 290 have exchanged package collection locations, the position of the limit switches LS2 and LS3 de-energize relay CR7; contacts CR7-2 close to cause relay CR8 to become energized.

The energized relay CR8 opens normally closed contacts CR8-1 to de-energize the relay CR5.

The contacts CR5-2 close.

When the tongue 28 is fully retracted the limit switch LS4 is moved to the NO position.

A new packaging cycle begins.

The circuit has a manual stop button 324.

FIG. 15 shows the apparatus of FIGS. 1 and 2 used with a container 24 having a hollow porous pylon 25' (the apertures in the pylon being denoted by the reference numeral 340). This arrangement permits withdrawal of air from the bottom wall (not through the package) via the hollow of the pylon 25'. The air flow discourages boundary layer formation and air turbulence adjacent the pylon.

I claim:

1. The method of producing and packaging a coherent linear sliver-like glass textile element capable of being formed into a yarn comprising:
   supplying discontinuous glass fibers;
   transporting the fibers in a body of moving gas to an advancing porous surface;
   depositing the fibers onto the advancing porous surface in sufficient interengaging relationship to form a coherent web;
   drawing the moving gas through the openings in the advancing porous surface in the region of fiber deposition to separate the gas from the fibers;
   advancing the surface along a path effective to move the web of fibers across a stationary opening having a progressively reducing dimension in the direction of surface advancement;
   drawing air into the stationary opening through the fibers of the web and the porous surface with sufficient energy to gather the fibers of the web in a direction laterally of the advancement of the surface, the web being gathered progressively as it is moved across the stationary opening into a relatively loosely associated but coherent linear sliver-like textile element;
   linearly advancing the linear fibrous textile element downwardly to collect in a rotating foraminous container;
   withdrawing air from the container through its foraminous bottom wall to move the air downwardly through the body formed by the collected portion of the fibrous element building-up in the container and thereby prevent freedom of movement of the fibrous element of the body during packaging;
   simultaneously withdrawing air uniformly from all sides of the container in a direction laterally through its foraminous sidewall portion to reduce air turbulence in the container and thereby promote conditions in the container for orderly collection of the fibrous element during its packaging.

2. The method of claim 1 including supplying the discontinuous glass fibers from a rotary source.

3. The method of claim 1 including depositing the glass fibers on the porous circumferential surface of a rotating member.

4. The method of claim 3 in which the linear fibrous textile element is projected linearly downwardly into the rotating foraminous container.

5. The method of claim 4 in which the linear fibrous textile element is projected downwardly into a porous liner in the porous container.

6. The method of claim 4 further including reciprocating the downwardly projected fibrous linear element in a direction generally radially of the axis of rotation of the container.

7. The method of claim 6 including reciprocating the downwardly projected linear fibrous element by impinging the element against a reciprocating guide surface.

8. Apparatus for producing and collecting a coherent linear glass element comprising:
rotary means for forming discontinuous glass fibers of sufficient length to interengage themselves;
a fiber collection wheel rotatable about a horizontal including a porous rim portion upon which fibers are deposited;
means for rotating the wheel;
means for conveying the fibers in a body of moving gaseous media from the glass fiber forming means to the wheel for collection of the porous rim in sufficient interengaging relation to form a coherent web;
means for establishing a zone of reduced pressure within the wheel to draw gaseous media through the porous rim and thereby hold the fibers of the web on the rim;
means within the wheel defining a stationary longitudinal opening having a progressively reducing size on the direction of the circumferential axis of the rim;
means for establishing reduced pressure within the wheel to draw air through the fibers of the web into the longitudinal opening to progressively laterally condense the web into a coherent linear fibrous glass element during rotation of the wheel, the linear fibrous glass element being linearly projected downwardly from the porous rim during rotation of the wheel;
an open topped foraminous walled container rotatable about a vertical axis under the wheel for collecting the downwardly projected linear fibrous element into a package;
means for rotating the container;
means for withdrawing air from the container through its foraminous bottom wall to move air through the package in the container and thereby prevent freedom of movement of the collected portion of the linear element during collection; and
means for withdrawing air uniformly from all sides of the container in a direction laterally through its foraminous sidewall portion to reduce air turbulence in the container.

* * * * *